United States Patent [19]

Mori et al.

[11] Patent Number: 4,846,554

[45] Date of Patent: Jul. 11, 1989

[54] LENS-HOLDING APPARATUS

[75] Inventors: Kei Mori, 3-16-3-501, Kaminoge, Setagaya-ku, Tokyo; Isao Kosugi, Tokyo, both of Japan

[73] Assignee: Kei Mori, Tokyo, Japan

[21] Appl. No.: 220,633

[22] Filed: Jul. 18, 1988

[30] Foreign Application Priority Data

Dec. 31, 1987 [JP] Japan .................................. 62-336336

[51] Int. Cl.[4] .............................................. G02B 7/02
[52] U.S. Cl. .................................... 350/252; 350/319; 350/257; 350/451
[58] Field of Search ............... 350/252, 253, 255, 257, 350/319, 451, 452, 96.18, 96.23

[56] References Cited

U.S. PATENT DOCUMENTS

| | | | |
|---|---|---|---|
| 2,707,418 | 5/1955 | Magnuson | 350/257 |
| 2,991,691 | 7/1961 | Schering | 350/451 |
| 4,045,129 | 8/1977 | Hamar | 350/252 |
| 4,409,963 | 10/1983 | Mori | 350/452 |
| 4,434,786 | 3/1984 | Lanciault | 350/252 |

Primary Examiner—Rodney B. Bovernick
Assistant Examiner—Loha Ben
Attorney, Agent, or Firm—Jordan and Hamburg

[57] ABSTRACT

A lens-holding apparatus used for holding a hexagonal lens and for fixing the light receiving end of an optical conductor at the focal point of the lens includes a frame body having a hexagonal portion on at least a part thereof, a hexagonal lens tightly inserted into the hexagonal portion, and an optical conductor cable fixing mechanism for fixing the light-receiving end of the optical conductor at the focal point of the lens on another portion of the frame body. The hexagonal portion comprises six side surfaces, every other one of which has two slits formed symmetrically in relation to the center line of each side surface in the longitudinal direction for mounting the lens thereon and a tongue piece formed between both slits. The lens is tightly inserted into the hexagonal portion and held therein by means of a tongue piece for pressing the lens.

7 Claims, 3 Drawing Sheets $l > l'$

4,846,554

LENS-HOLDING APPARATUS

BACKGROUND OF THE INVENTION

The present invention relates to a lens holding apparatus preferably employed in the case of guiding the sun's rays focused by a lens into an optical conductor cable.

The present applicant has previously proposed in various ways a sun ray collecting device in which the sun's rays are focused by a lens, guided into an optical conductor, and then transmitted through the optical conductor onto an optional desired place for use in illumination or for other like purposes. Furthermore, the present applicant has also proposed that the aforementioned sun ray collecting device be accommodated in a transparent capsule in order to protect the lens from wind, rain, dust etc.

The sun ray collecting device previously proposed by the present applicant has a cylindrical foundation, a dome-shaped head portion made of a transparent substance, and a capsule for use in the sun ray collecting device consisting of a foundation and a head portion. When the device is being employed, the sun ray collecting device is accommodated inside the capsule. The sun ray collecting device comprises, for instance, a large number of lenses, a large number of lens-holding apparatuses provided for the respective lenses, and a large number of optical fibers or an optical conductor cable having a light-receiving end placed at the focal position of the lens.

The sun's rays focused by the lenses are guided into the optical conductor cable and transmitted through it onto an optional desired place.

SUMMARY OF THE INVENTION

It is the object of the present invention to provide a lens-holding mechanism for positioning the lens at a pre-determined spot and for fixing the same thereon precisely and securely.

It is another object of the present invention to provide a lens-holding apparatus not only capable of holding a lens securely and firmly but of being simple and of low-cost construction.

The above-mentioned features and other advantages of the present invention will be apparent from the following detailed description which goes with the accompanying drawings.

BRIEF DESCRIPTION OF THE DRAWINGS

FIG. 2 is an enlarged cross-sectional view showing respectively the lens and the tongue piece FIG. 5 in a state of separation.

DESCRIPTION OF THE PREFERRED EMBODIMENT

Figure 1:
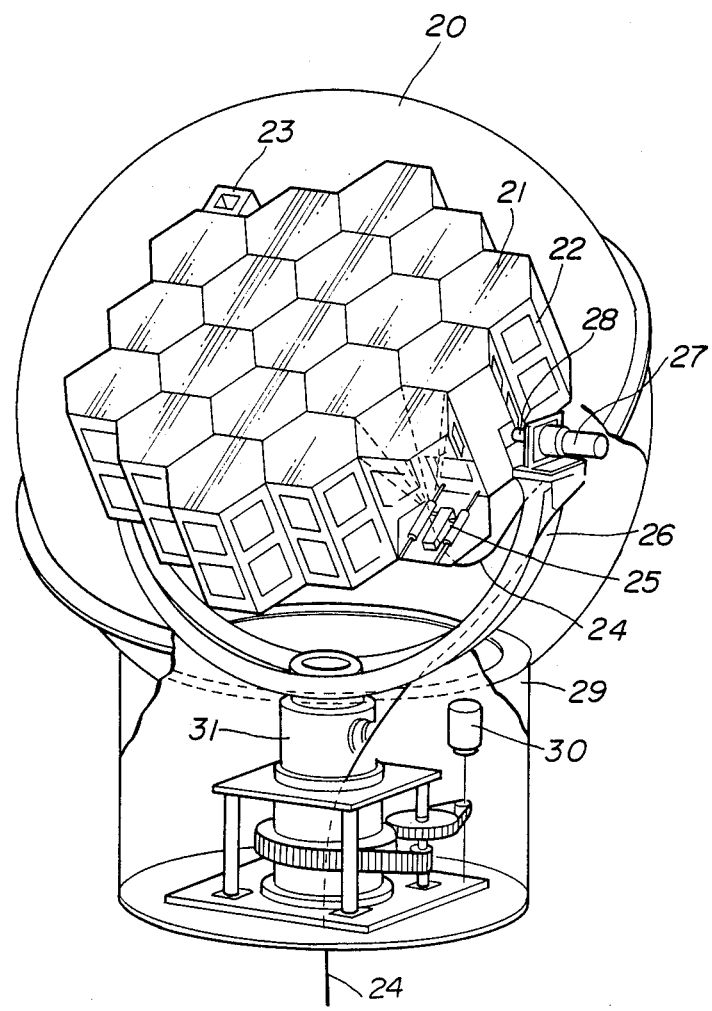
FIG. 1 is a detailed perspective view for explaining an embodiment of a sun ray collecting device employing a lens-holding apparatus according to the present invention.

FIG. 1 is a detailed, perspective view for explaining an embodiment of a sun ray collecting device employing a lens-holding apparatus according to the present invention. In FIG. 1, the reference numeral 20 designates a transparent protective capsule, 21 a Fresnel lens, 22 a lens-holding apparatus, 23 a direction sensor for sensing the direction of the sun's rays, 24 an optical fiber (or an optical conductor cable) having a light-receiving end to be disposed at the focal position of the Fresnel lens 21, 25 a fiber holder, 26 an arm, 27 a pulse motor, 28 a horizontal rotatable shaft rotated by the pulse motor 27, 29 a foundation for carrying the protective capsule 20, 30 a pulse motor, and 31 a vertical rotatable shaft turned by the pulse motor 30.

As was already proposed by the present applicant, the above-mentioned sun ray collecting device detects the direction of the sun by use of the sun ray direction sensor 23, and its direction signal drives the pulse motors 27 and 30. Both the pulse motors 27 and 30 rotate the horizontal rotatable shaft 28 and the vertical rotatable shaft 31, respectively, so as to guide the sun ray direction sensor 23 in the direction of the sun. In such a way, the sun's rays focused by each of the lenses 21 are guided into the optical fibers 24 having the light-receiving end disposed at the focal position of the respective lenses. An optical fiber is provided for each lens and led out from the sun ray collecting device and placed at an optional desired place where it is used.

The present invention aims to provide a mechanism for positioning the lens at a pre-determined location and for fixing the same thereon precisely and securely.

Figure 2:
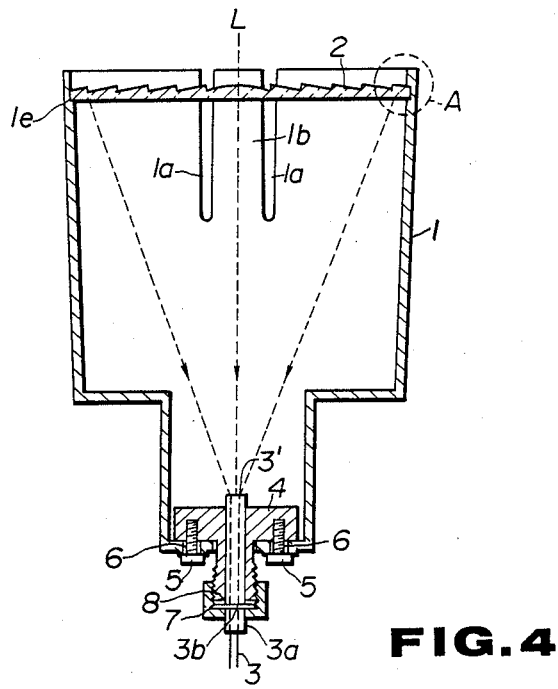
FIG. 2 is a side, cross-sectional view showing the main part of an embodiment for explaining a lens-holding apparatus while in use according to the present invention (a cross-sectional view taken along the line I—I of FIG. 3)
Figure 3:
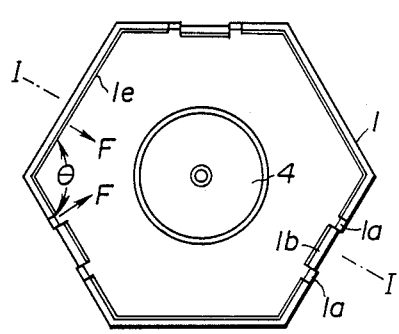
FIG. 3 is a plane view of the lens-holding apparatus, from which a lens is removed.
Figure 4:
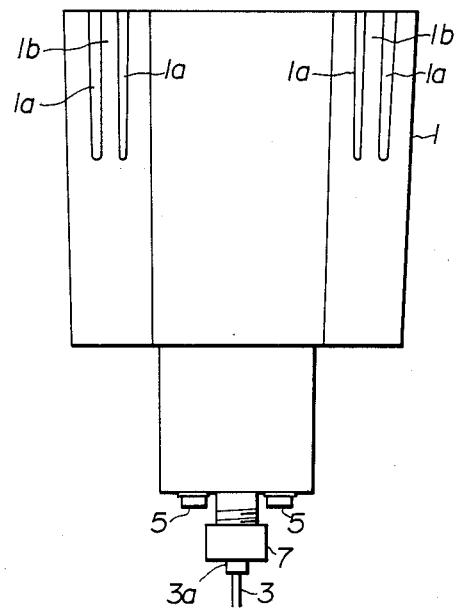
FIG. 4 is a side view thereof.

FIG. 2 is a side cross-sectional view showing the main part of an embodiment for explaining a lens-holding apparatus while in use according to the present invention (a cross-sectional view taken along the line I—I of FIG. 3). FIG. 3 is a plane view of the lens-holding apparatus, from which a lens is removed. FIG. 4 is a side view thereof. In those figures, the reference numeral 1 designates a lens-fixing frame body having a lens-holding portion formed in the shape of a hexagon at the front or upper end portion thereof, 2 a hexagonal Fresnel lens disposed on the hexagonal portion at the front or upper end of the lens-fixing frame body 1, 3 an optical conductor cable, 4 an optical conductor holding member mounted on the rear or lower end portion of the lens-fixing frame body 1, 5 bolts for fixing the optical conductor cable holding member 4 on the rear or lower end portion of the lens-fixing frame body 1, and 6 mounting holes formed on the rear or lower end portion of the lens-fixing frame body 1. The mounting hole 6 is bored as an idle (loosened) hole which is larger than the diameter of the bolt 5. After provisionally mounting the optical cable holding member 4 onto the rear or lower end portion of the fixing frame 1 by use of the bolts 5 in the state as shown in FIG. 2, a position adjustment is done back-and-forth and right-and-left on the surface of the drawing (FIG. 2) such that the light-receiving end 3' of the optical conductor cable 3 is located at a position on the optical axis L of the lens 2. Thereafter the optical conductor cable holding member 4 is fixed in position by screwing the bolt 5.

The optical conductor cable 3 has thereon a protective outer cover 3a at its light-receiving end. The outer cover 3a is inserted into the hole while has been bored into the optical conductor cable holding member 4 as shown in FIG. 2. The outer side of the rear or lower end portion of the optical conductor cable holding member 4 is provided with a threaded portion. A cap or box nut 7 is screwed on and thereby engaged with the threaded portion as shown in FIG. 2 in order to firmly hold the optical conductor cable 3 in the state shown in FIG. 2. Namely, a collar 3b is formed on the outer cover 3a of the optical conductor cable 3. The collar 3b is nippingly fixed between the lower end portion of the optical conductor cable holding member 4 and the inner bottom surface of the cap or box nut 7.

In the embodiment shown in FIG. 2, a spacer 8 is placed between the lower end surface of the optical conductor cable holding member 4 and the collar 3b. The spacer 8 is used for adjusting the portion of the light-receiving end surface 3' of the optical conductor cable 3 in the direction of the lens's optical axis. For instance, when there is no spacer 8 there-between the position of the optical conductor cable's light-receiving end surface 3' is adjusted to the focal position of the red-colored component contained in the sun's rays focused by the lens 2. When one spacer is deposited there-between, its position is adjusted to the focal position of the green-colored component contained in the sun's rays focused by the lens 2 and when another thicker spacer or two pieces of the afore-mentioned spacer 8, having the same thickness, are deposited there-between, its position is adjusted to the focal position of the blue-colored component contained in the sun's rays focused by the lens 2.

Furthermore, if the size of the lens-holding frame body 1, the installment position of the lens 2, the dimension of the optical conductor cable holding member 4, the position of the collar 3b, and so on are precisely determined and assembled, the light-receiving end surface 3' of the optical conductor cable 3 can be automatically adjusted to the focal position of the light ray components having the desired wave-length contained in the sun's rays focused by the lens 2.

The lens-holding apparatus, according to the present invention, is used in the way mentioned above. The same has a lens-holding portion formed in the shape of a hexagon. The lens is also formed in the shape of a hexagon in order to fit the lens to the lens-holding portion. As is well known, in such a construction, a large number of lenses can be effectively arranged without using up needless space between the respective lenses which are adjacent to each other. The hexagonal portion of the above-mentioned lens-fixing frame body 1 has plural (six) side surfaces. Some of them, for instance, every other one of them, have a pair of groove (slits) 1a and 1a formed symmetrically in relation to the center line L of each side surface in the direction of the axis (longitudinal direction) and a tongue piece 1b formed between the grooves 1a and 1a.

And further, the frame body 1, according to the above-mentioned invention, is unitarily molded by the use of an acrylic resin or the like in the shape of a hexagon. In the case of providing a tongue piece 1b as mentioned above, since the internal angle $\theta$ of its hexagonal cross-section is less than 180°, the tongue piece 1b is given a force F for bending it into the inside of the hexagon as shown in FIG. 3. Consequently, the tongue piece 1b may be situated in a space inside of the hexagon as shown in FIG. 3.

Therefore, if the lens 2 is tightly inserted into the frame body in the way shown in FIG. 2, the tongue piece 1b presses the lens 2 by the action of a spring in order to securely fix the lens 2 inside the frame body. And further, the other portion excluding the tongue piece is formed as a step portion 1e. The outer diameter of the step portion 1e is equal to the diameter of the lens 2. For this reason the lens 2 can be tightly and securely inserted at the step portion 1e into the hexagonal portion of the frame body.

Figure 5:
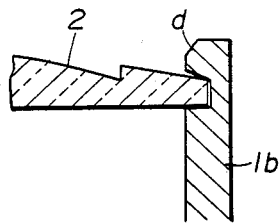
FIG. 5 is an enlarged cross-sectional view of the portion A shown in FIG. 2.

FIG. 5 is an enlarged cross-sectional view of the portion A shown in FIG. 2 showing a state of combining the frame body with the lens 2 to be tightly inserted thereinto at the above-mentioned tongue piece portion 1b.

Figure 6:
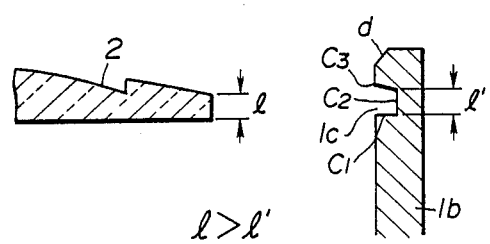

FIG. 6 is an enlarged cross-sectional view showing respectively the lens 2 and the tongue piece 1b in a state of separation. In FIG. 6, a groove 1c for tightly inserting the circumferential portion of the lens 2 thereinto is formed on the inner surface of the tongue piece 1b. The size of the groove 1c is selected as shown hereinafter. Namely, the lower end surface C1 of the groove 1c is formed as a horizontal surface and a vertical surface going to the lower end surface C1, and further, the upper end surface C3 going to the vertical surface C2 is formed so as to open upward and obliquely. Furthermore, when the thickness of the circumferential portion of the lens 2 is equal to l, the vertical surface C2 of the groove 1c is formed such that the height of the vertical surface $C2(=l')$ is smaller than that of the lens' circumferential portion l, namely $l' \leq l$.

Consequently, when the lens 2 is tightly inserted into the groove portion 1c, the upper end surface of the lens 2 hits on the inclined surface C3 of the groove portion 1c, and is pushed downward by the action of the spring force of the tongue piece 1b. Thereby, the lens 2 is firmly and securely fixed on the surface in the groove portion 1c. And further, the tongue piece 1b has rounded corners at the inner side of the upper end thereof as shown in FIGS. 5 and 6. In such a construction, when the tongue portion 1b is opened a little and the lens 2 is pushed into the frame body from the upper side thereof at the time of mounting the lens, the position of the lower surface of the lens 2 is determined by the step portion 1e and the lower end surface C1 of the tongue piece portion 1c and fixed thereon.

Moreover, the above-mentioned lens-holding frame body 1 is unitarily molded by the use of an acrylic resin, and if the lens 2, held by the lens-holding frame body 1, is made of the same material as that of the lens-holding frame body 1, both the thermal expansion rates of the lens 2 and the lens-holding frame body 1 become equal to each other. As a result, the combined state of the lens and its holding frame body won't be disturbed because of the expansion rate difference there-between when the ambient temperature changes so that the lens can be held therein firmly and securely all the time.

As is apparent from the foregoing description, according to the present invention, it may be possible to provide a lens-holding apparatus capable of holding a lens securely and firmly and being of a simple and low-cost construction.

We claim:

1. A lens-holding apparatus comprising a frame body having a hexagonal portion on at least a part thereof, a hexagonal lens tightly inserted into said hexagonal portion at a front end thereof, an optical conductor cable fixing mechanism for fixing a light-receiving end of an optical conductor at the focal point of said lens on a rear portion of said frame body and used for guiding light rays focused by said lens into said optical conductor cable, said hexagonal portion comprising six side surfaces, every other one of which has two slits formed symmetrically in relation to the center line of each side surface and extending in the longitudinal direction at a front end portion of the respective side surfaces for mounting said lens thereon and a tongue piece formed between said two slits, said lens being tightly inserted into said hexagonal portion and held therein by means of each tongue piece which presses said lens.

2. A lens-holding apparatus, as defined in claim 1, wherein a groove is formed, respectively, on an inner wall of each tongue piece and an outer edge portion of said lens is tightly inserted into said groove.

3. A lens-holding apparatus, as defined in claim 2, wherein said groove formed on said tongue piece comprises a horizontal surface at the lower end thereof, a vertical surface vertically extending from said horizontal surface, and an upper surface inclined and open upward from said vertical surface, and the vertical length of said vertical surface is equal to or a little smaller than the thickness of said outer edge portion of said lens.

4. A lens-holding apparatus as defined in claim 3, wherein a front end inner side of said tongue piece has a round corner.

5. A lens-holding apparatus as defined in claim 4, wherein a step portion is provided on the inner side of said hexagonal portion excluding said tongue piece, said step portion coinciding with said horizontal surface of said groove of said tongue piece and the outer diameter of said step portion being equal to the diameter of said lens.

6. A lens-holding apparatus, as defined in claim 1, wherein said frame body is unitarily molded of an acrylic resin.

7. A lens-holding apparatus as defined in claim 1, wherein said lens and said frame body are made of the same material.

* * * * *